United States Patent
Abdollahian et al.

(10) Patent No.: US 9,582,727 B2
(45) Date of Patent: Feb. 28, 2017

(54) TEXT RECOGNITION SYSTEM WITH FEATURE RECOGNITION AND METHOD OF OPERATION THEREOF

(71) Applicant: Sony Corporation, Tokyo (JP)

(72) Inventors: Golnaz Abdollahian, San Jose, CA (US); Alexander Berestov, San Jose, CA (US); Hiromasa Naganuma, Ichikawa (JP); Hiroshige Okamoto, Yokohama (JP)

(73) Assignee: SONY CORPORATION, Tokyo (JP)

( * ) Notice: Subject to any disclaimer, the term of this patent is extended or adjusted under 35 U.S.C. 154(b) by 167 days.

(21) Appl. No.: 14/599,423

(22) Filed: Jan. 16, 2015

(65) Prior Publication Data
US 2016/0210522 A1     Jul. 21, 2016

(51) Int. Cl.
*G06K 9/18*      (2006.01)
*G06K 9/20*      (2006.01)
*G06K 9/48*      (2006.01)

(52) U.S. Cl.
CPC ............. *G06K 9/18* (2013.01); *G06K 9/2027* (2013.01); *G06K 9/481* (2013.01)

(58) Field of Classification Search
CPC ........ G06K 9/18; G06K 9/4604; G06K 9/481; G06K 9/50
See application file for complete search history.

(56) References Cited

U.S. PATENT DOCUMENTS

| | | | |
|---|---|---|---|
| 5,268,967 A | 12/1993 | Jang et al. | |
| 5,321,770 A | 6/1994 | Huttenlocher et al. | |
| 5,809,167 A | 9/1998 | Al-Hussein | |
| 5,892,843 A | 4/1999 | Zhou et al. | |
| 6,470,094 B1 | 10/2002 | Lienhart et al. | |
| 7,010,166 B2 * | 3/2006 | Ayshi | G06K 9/4604 382/199 |
| 7,327,882 B2 | 2/2008 | Wang et al. | |
| 8,208,698 B2 | 6/2012 | Bogdan | |
| 8,224,092 B2 | 7/2012 | Bressan | |
| 8,290,274 B2 * | 10/2012 | Mori | G06K 9/00416 382/186 |
| 8,311,329 B2 | 11/2012 | Meyer et al. | |
| 8,335,402 B1 | 12/2012 | Manmatha et al. | |

(Continued)

OTHER PUBLICATIONS

Saragiotis et al., "Local Skew Correction in Documents", "International Journal of Pattern Recognition and Artificial Intelligence", 2008, 20 Pages (691-710), vol. 22, No. 4, World Scientific Publishing Company.

(Continued)

*Primary Examiner* — Gregory M Desire
(74) *Attorney, Agent, or Firm* — Haverstock & Owens LLP

(57) ABSTRACT

A text recognition system and method of operation thereof including: a storage unit for storing a text unit; and a processing unit, connected to the storage unit, the processing unit including: a communication interface for receiving the text unit, a feature detection module for determining an isolated feature of the text unit, an angle detection module for determining angle features of the text unit, a feature vector module for generating a feature vector for the text unit based on the isolated feature and the angle features, and a text recognition module for determining recognized text using the feature vector for display on a display interface.

20 Claims, 6 Drawing Sheets

(56) References Cited

U.S. PATENT DOCUMENTS

| | | | |
|---|---|---|---|
| 8,509,534 | B2 | 8/2013 | Galic et al. |
| 8,649,600 | B2 | 2/2014 | Saund |
| 8,917,935 | B2 | 12/2014 | Epshtein et al. |
| 2005/0180647 | A1 | 8/2005 | Curry et al. |
| 2006/0078200 | A1* | 4/2006 | Koyama ............ G06K 9/00456 382/181 |
| 2010/0310172 | A1* | 12/2010 | Natarajan .......... G06K 9/00865 382/187 |
| 2011/0280484 | A1* | 11/2011 | Ma ..................... G06K 9/00416 382/185 |
| 2014/0140635 | A1* | 5/2014 | Wu ........................ G06T 5/006 382/266 |
| 2014/0193029 | A1* | 7/2014 | Vassilieva .............. G06K 9/346 382/103 |
| 2014/0219561 | A1* | 8/2014 | Nakamura ............. G06K 9/344 382/176 |
| 2015/0169972 | A1 | 6/2015 | Vu et al. |
| 2016/0210522 | A1* | 7/2016 | Abdollahian ............ G06K 9/18 |

OTHER PUBLICATIONS

U.S. Appl. No. 14/599,417, filed Jan. 16, 2015, Abdollahian.
U.S. Appl. No. 14/599,431, filed Jan. 16, 2015, Abdollahian et al.
Dawood et al., Improved Arabic Word Classification using Spatial Pyramid Matching Method, , p. 6 pgs, Image Processing and Pattern Recognition Laboratory, Beijing Normal University, Beijing, China; Retrieved on Dec. 4, 2013.
Epshtein et al., Detecting Text in Natural Scenes with Stroke Width Transform, pp. 1-8, Microsoft Corporation; Retrieved on Dec. 4, 2013.
Gatos et al., Restoration of Arbitrarily Warped Document Images Based on Text Line and Word Detection, Pattern Recognition, and Applications, Feb. 14, 2007, pp. 203-208, Proceedings of the Fourth IASTED International Conference Signal Processing, Innsbruck, Austria.
Gllavata et al., A Robust Algorithm for Text Detection in Images, , p. 6pgs. University of Siegen, Siegen, Germany, Dept. of Math. & Computer Scienve; Retrieved on Dec. 5, 2013.
Neumann, Scene text recognition in images and video, PhD Thesis Proposal, Aug. 31, 2012, p. 56 pgs, Department of Cybernetics, Center for Machine Perception, Czech Technical University in Prague, Czech.
Rothacker, Learning Bag-of-Features Representations for Handwriting Recognition, Diploma thesis, Nov. 2011, p. 90 pgs, Department of computer Technische Universitt Dortmund, Germany.
Song et al., A Novel Image Text Extraction Method Based on K-means Clustering, Seventh IEEE/ACIS International Conference on Computer and Information Science, 2008, pp. 185-190, IEEE, Beijing, China.
Yang et al., Evaluating Bag-of-Visual-Words Representations in Scene Classification, Woodstock '97 El Paso, Texas, , p. 9 pgs, US.

* cited by examiner

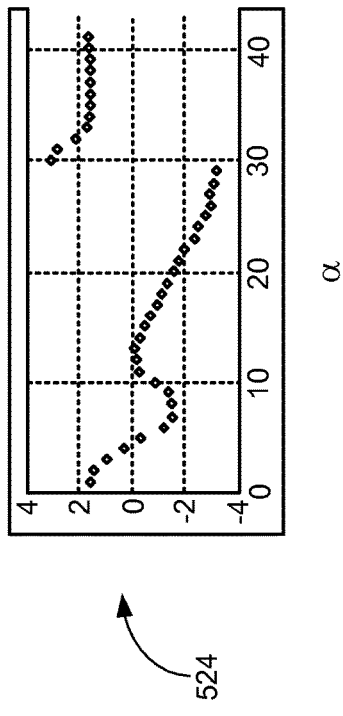
↙ 524
FIG. 6
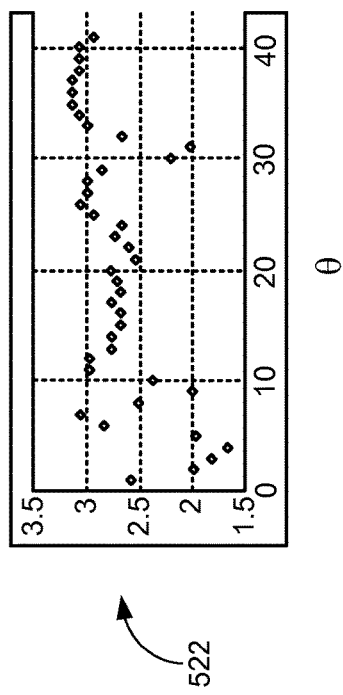
↙ 522
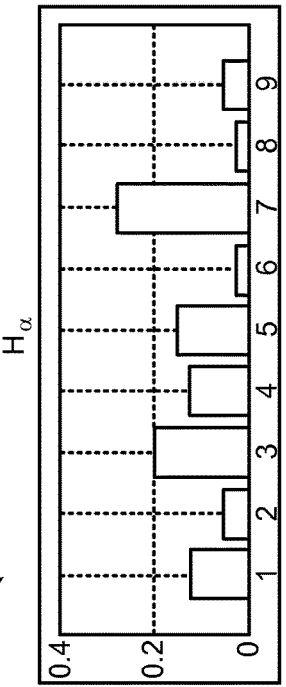
↙ 724
FIG. 7
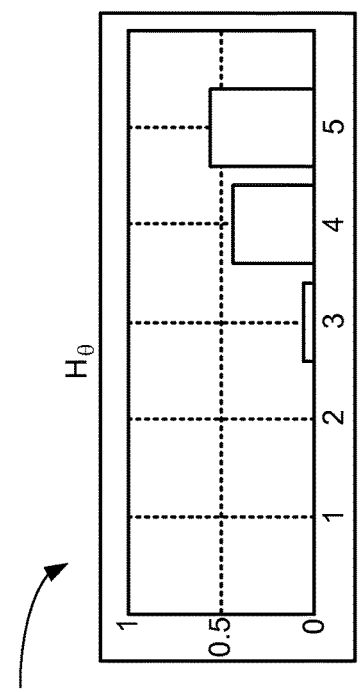
↙ 722

TEXT RECOGNITION SYSTEM WITH FEATURE RECOGNITION AND METHOD OF OPERATION THEREOF

CROSS-REFERENCE TO RELATED APPLICATION(S)

The present application contains subject matter related to a concurrently filed U.S. Patent Application by Golnaz Abdollahian entitled "IMAGE PROCESSING SYSTEM WITH LAYOUT ANALYSIS AND METHOD OF OPERATION THEREOF". The related application is assigned to Sony Corporation and is identified as U.S. patent application Ser. No. 14/599,417, filed Jan. 16, 2015 (now U.S. Pat. No. 9,430,704). The subject matter thereof is incorporated herein by reference thereto.

The present application contains subject matter related to a concurrently filed U.S. Patent Application by Golnaz Abdollahian, Alexander Berestov, Hiromasa Naganuma, and Hiroshige Okamoto entitled "IMAGE PROCESSING SYSTEM FOR CLUTTERED SCENES AND METHOD OF OPERATION THEREOF". The related application is assigned to Sony Corporation and is identified as U.S. patent application Ser. No. 14/599,431, filed Jan. 16, 2015. The subject matter thereof is incorporated herein by reference thereto.

TECHNICAL FIELD

The present invention relates generally to a text recognition system, and more particularly to a system for recognizing text using feature recognition.

BACKGROUND ART

Optical character recognition (OCR), or text recognition is used to translate text from paper to digital documents that can be easily searched, shared, and stored. Traditional OCR techniques work for printed text such as text generated by a printer or typewriter, but can fail when confronted by handwritten text, or text that is in a script with connected characters, such as when writing in cursive English or standard Arabic.

Thus, a need still remains for effective text recognition of all kinds of text and not just printed English. In view of the rapid rise of the global economy, it is increasingly critical that answers be found to these problems. In view of the ever-increasing commercial competitive pressures, along with growing consumer expectations and the diminishing opportunities for meaningful product differentiation in the marketplace, it is crucial that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a text recognition system including: receiving a text unit; determining an isolated feature of the text unit; determining angle features of the text unit; generating a feature vector for the text unit based on the isolated feature and the angle features; and determining recognized text using the feature vector for display on a display interface.

The present invention provides a text recognition system, including: a storage unit for storing a text unit; and a processing unit, connected to the storage unit, the processing unit including: a communication interface for receiving the text unit, a feature detection module, coupled to the communication unit, for determining an isolated feature of the text unit, an angle detection module, coupled to the communication unit, for determining angle features of the text unit, a feature vector module, coupled to the feature detection module and the angle detection module, for generating a feature vector for the text unit based on the isolated feature and the angle features, and a text recognition module, coupled to the feature vector module, for determining recognized text using the feature vector for display on a display interface.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 6 is two exemplary plots of the angle $\theta$ and the angle $\alpha$ for the text unit of FIG. 2.

FIG. 7 is two exemplary histograms of the angle $\theta$ and the angle $\alpha$ derived from the plots of FIG. 6.

BEST MODE FOR CARRYING OUT THE INVENTION

Figure 1:
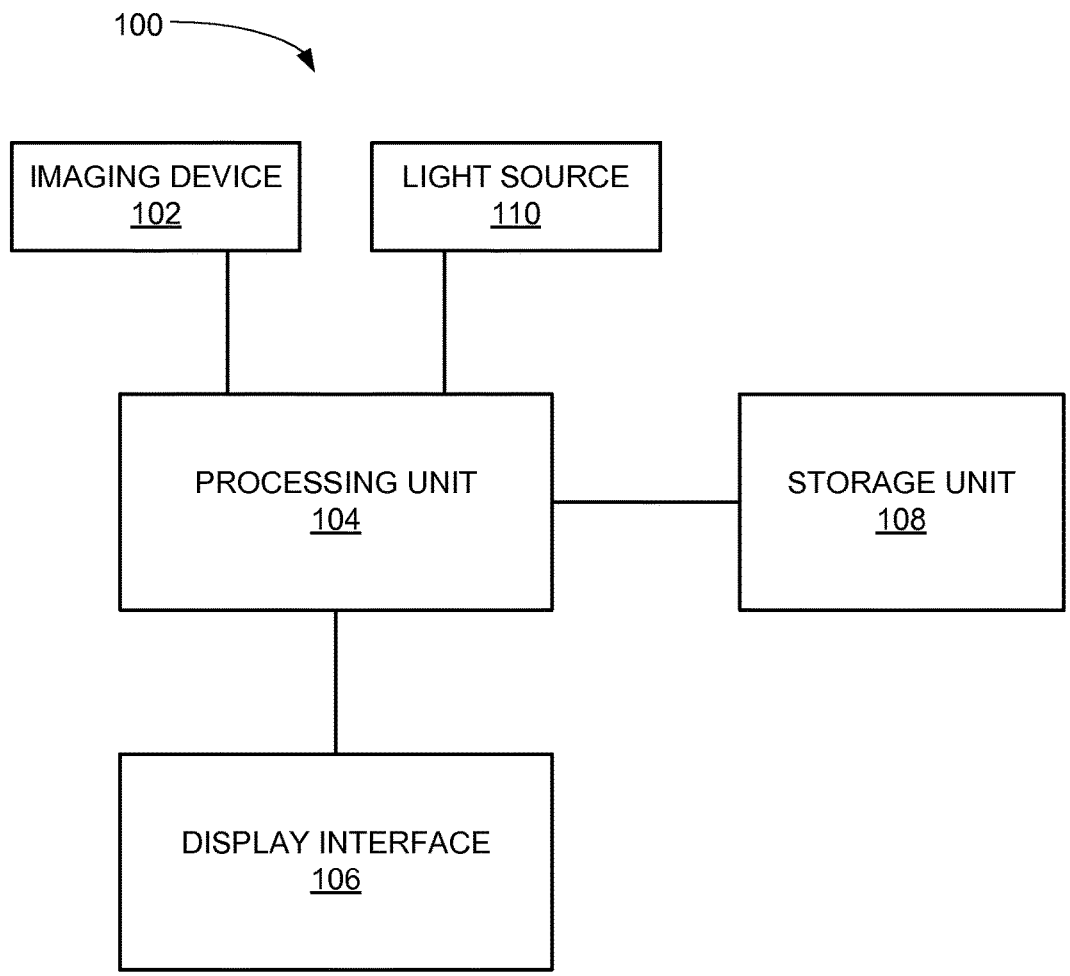
FIG. 1 is a schematic of a text recognition system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals.

For expository purposes, the term "horizontal" as used herein is defined as a plane parallel to the proper reading plane, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

Referring now to FIG. 1, therein is shown a schematic of a text recognition system 100 in an embodiment of the present invention. Shown are an image capture device 102, a processing unit 104, and a display interface 106.

The image capture device 102 can be a camera, scanner, or other device capable of capturing still frames. The image capture device 102 is connected to the processing unit 104, which is connected to the display interface 106 and a storage unit 108. The display interface 106 can display identified text which has been imaged with the image capture device 102. Also connected to the processing unit 104 is a light source 110 for illuminating objects in view of the image capture device 102. The processing unit 104 is shown as connected to the light source 110 for illustrative purposes, but it is understood that the light source 110 can also be separate from the processing unit 104. Furthermore, it is understood that the light source 110 can be ambient natural or artificial light.

The processing unit 104 can be any of a variety of semiconductor devices such as a desktop or laptop computer, a specialized device, embedded system, or simply a computer chip integrated with the image capture device 102 and/or the display interface 106. The display interface 106 can utilize a variety of display technologies such as LCD, LED-LCD, plasma, holographic, OLED, front and rear projection, CRT, or other display technologies.

The processing unit 104 can contain many modules capable of performing various functions. For example, the processing unit 104 can have a communication interface coupled to a feature detection module and an angle detection module, a boundary determination module coupled to the angle detection module, a feature vector module coupled to the angle detection module and the feature detection module, and a text recognition module coupled to the feature vector module. The processing unit can run some or all of the modules simultaneously.

For example, the image capture device 102 can be used in conjunction with the light source 110 in order to capture an image for text extraction and identification by the text recognition system 100. The image captured by the image capture device 102 and the light source 110 can be stored in the storage unit 108. The processing unit 104 can process the image and identify text for display of the identified text isolated from the image on the display interface 106. The image capture device 102, the processing unit 104, and the display interface 106 can be connected in various ways to operate the text recognition system 100. For example, the text recognition system 100 can be integrated into a handheld camera, phone, tablet, or operated as a camera or scanner attached to a desktop computer or laptop. Also for example, the image capture device 102 can be remote from the processing unit 104, and can be connected through a wired or wireless networking protocol.

Figure 2:
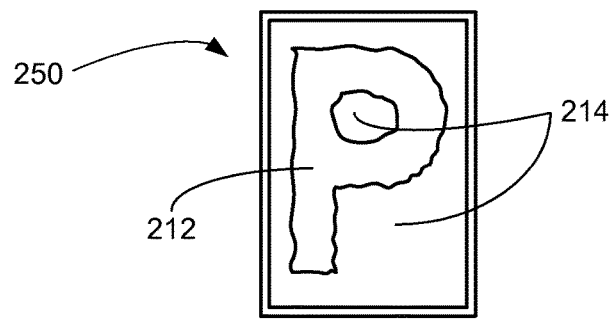
FIG. 2 is an example of a text unit ready for analysis with the text recognition system.

Referring now to FIG. 2, therein is shown an example of a text unit 250 ready for analysis with the text recognition system 100. The text unit 250 is a graphical element containing textual characters and a graphical background including detail on what portions of the text unit 250 are a text region 212 and which are a background region 214. The text unit 250 can be derived from a portion of a source image, which can be captured by the image capture device 102, for example. The text unit 250 can also be extracted from a portion of a processed version of the source image, such as the binary text mask of the source image. For example, the text unit can be an extracted portion of the source image encompassing a word of text in the source image.

A single character is shown in the text unit 250 for illustrative purposes, but it is understood that the text recognition system 100 can operate on larger textual units. For example, the text unit 250 can include individual characters, entire words, phrases, or full sentences. A double border is shown around the text unit 250 for clarity purposes only and is not meant to limit the invention in any way. The communication interface of the processing unit 104 can receive the text unit 250 from the storage unit 108, for example.

Figure 3:
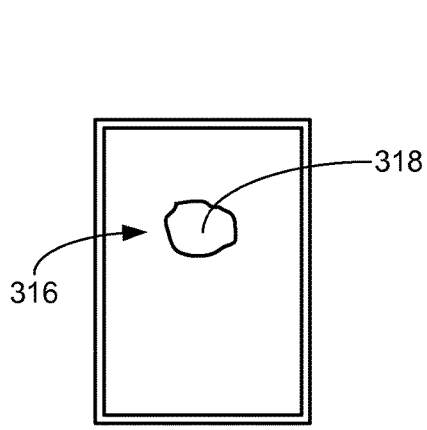
FIG. 3 is an example of one of many possible text features extracted from the text unit of FIG. 2.

Referring now to FIG. 3, therein is shown an example of one of many possible text features 316 extracted from the text unit 250 of FIG. 2. In this example, a type of the text features 316 called an isolated feature 318 of a hole has been found in the text unit 250. The isolated feature 318 of a hole can be determined by using the feature detection module and checking to see which portions of the background region 214 of FIG. 2 are fully enclosed by the text region 212 of FIG. 2, for example. Also for example, the isolated feature 318 of a dot can be determined by checking to see which portions of the text region 212 in a roughly circular shape and a small percentage of the text unit 250 are fully surrounded by the background region 214. Other determination techniques are possible, and the preceding are examples only.

A single hole is shown in FIG. 3 as an example of the isolated feature 318, but this is for illustrative purposes only, and it is understood that there can be more than one of the isolated feature 318. For example, in the letter "B", there are two holes. If a word or phrase rather than a single character is being analyzed, multiple holes and multiple dots may be detected, as another example.

Figure 4:
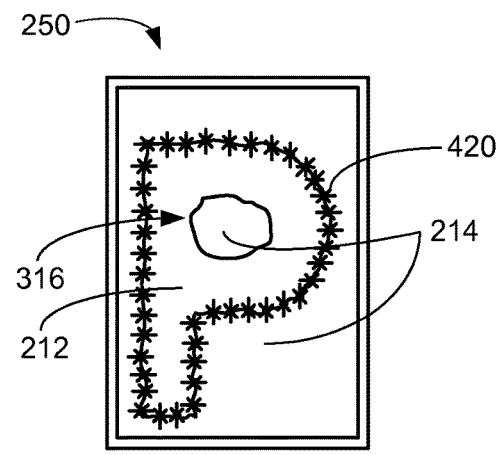
FIG. 4 is an example of the text unit in a boundary point determination phase of operation of the text recognition system.

Referring now to FIG. 4, therein is shown an example of the text unit 250 in a boundary point determination phase of operation of the text recognition system 100. Boundary points 420 are points along the boundary between the background region 214 and the text region 212 spaced at regular intervals. The boundary points 420 may not determined for some of the text features 316 such as a hole or a dot (for example, as with the letters "i" and "j") in order to save time and processing power. In this example, the boundary points 420 are represented by an asterisk centered on the actual location of the boundary points 420.

The boundary points 420 can be determined in various ways. For example, first some of the text features 316 that can be considered self-contained such as dots or holes can be excluded. Continuing the example, the boundary points 420 can be spaced along the boundary between the background region 214 and the text region 212 to provide coverage of the shape of the character, word, or phrase in question, but leaving enough space to avoid imaging defects (this can be seen in the not-quite-straight lines of FIG. 1). This process can be performed by the boundary determination module, for example. In this example, the boundary points 420 are spaced along the boundary of what appears to be the letter "P" at regular intervals but with high enough resolution to capture the curve of the "P".

Figure 5:
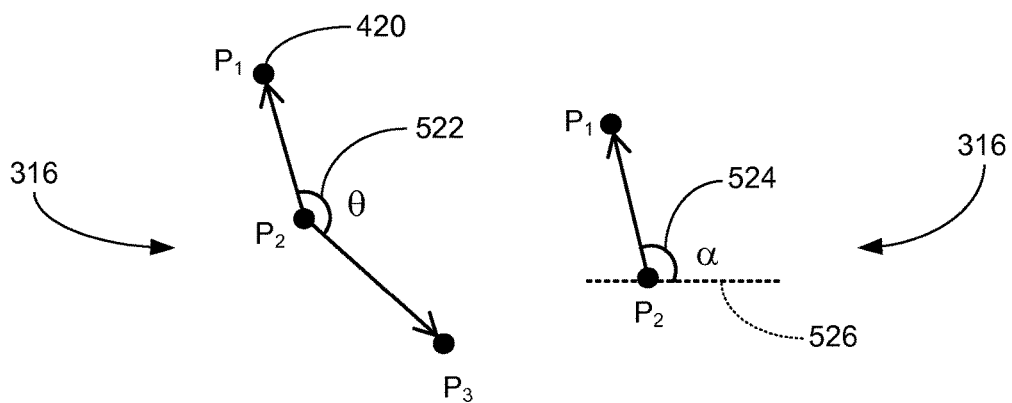
FIG. 5 is examples of angles used to characterize the relationship between the boundary points which are adjacent one another.

Referring now to FIG. 5, therein is shown examples of angles used to characterize the relationship between the boundary points 420 which are adjacent one another. The angles between groups of the boundary points 420 are angle features; one type of the text features 316.

An angle $\theta$ 522, for example, is defined as the angle found when a line is drawn between three of the boundary points 420 in sequence. More specifically, in this example, a line is drawn from one of the boundary points 420 which has been designated as point 1 (shown in FIG. 5 as P1) to another of the boundary points 420 designated as point 2 (shown in FIG. 5 as P2), and a second line is drawn from point 2 to yet another of the boundary points 420 designated as point 3 (shown in FIG. 5 as P3). The angle between the aforementioned two lines is the angle $\theta$ 522.

An angle $\alpha$ 524, for example, is defined as the angle between a line drawn between two of the boundary points 420 in sequence and a line drawn through one of the points which follows a text horizontal 526. The text horizontal 526 is included as a part of the text unit 250. The text horizontal 526 (shown in FIG. 5 as a dotted line for clarity) is the horizontal orientation of the text unit 250 such that any text within the text unit 250 is in the proper orientation for reading or analysis. In this example, the angle $\alpha$ 524 is determined by drawing a line from point 1 (P1) to point 2 (P2) and drawing the text horizontal 526 through point 2. The angle between the aforementioned two lines is the angle $\alpha$ 524.

Arrows shown are for illustrative purposes only, and there is no directionality implied with the lines used to determine the angle $\theta$ 522 or the angle $\alpha$ 524. Groups of the boundary points 420 overlap so that every sequential combination of the boundary points 420 can be covered. More detail on this follows in the description for FIGS. 6 and 7. It is understood that the two angles discussed are for illustrative purposes only, and that other angles using different combinations of the boundary points 420 are also possible. For example, a text vertical could be used.

Referring now to FIG. 6, therein is shown two exemplary plots of the angle $\theta$ 522 and the angle $\alpha$ 524 for the text unit 250 of FIG. 2. The y-axis on either plot is in units of $\pi/4$, or 45 degrees. For example, this means that the 2 on the y-axis corresponds to a 90 degree angle, and the 3 on the y-axis corresponds to a 135 degree angle.

The numbering for the x-axis on both plots can be based on the lowest numbered of the boundary points 420 of FIG. 4 in each grouping required to get the angle $\theta$ 522 and the angle $\alpha$ 524, for example. The numbering of the boundary points 420 can start at any of the boundary points 420 determined for the text unit 250. The boundary points 420 can be numbered sequentially from the starting point, for example. Also for example, the lowest numbered of the boundary points 420 within a grouping can be designated as point 1, the next point designated as point 2, and so on as a temporary designation for the purposes of determining the angle $\theta$ 522 or the angle $\alpha$ 524.

Referring now to FIG. 7, therein is shown two exemplary histograms of the angle $\theta$ 522 and the angle $\alpha$ 524 derived from the plots of FIG. 6. In other words, the frequency (y-axis) of a particular range of the many instances of the angle $\theta$ 522 and the angle $\alpha$ 524 (x-axis) can be plotted in a histogram. The histogram of the angle $\theta$ 522 can be considered as an angle $\theta$ feature 722 and is also labeled in FIG. 7 with $H_\theta$. The histogram of the angle $\alpha$ 524 can be considered as an angle $\alpha$ feature 724 and is also labeled in FIG. 7 with $H_\alpha$. The range used can be adjusted for requirements of resolution such that the angle $\theta$ feature 722 and the angle $\alpha$ feature 724 can be largely unique to the particular text within the text unit 250 of FIG. 2, for example. The entire process from grouping the boundary points 420 of FIG. 4 to determining the angle $\theta$ feature 722 and the angle $\alpha$ feature 724 can be performed by the angle detection module, for example.

Figure 8:
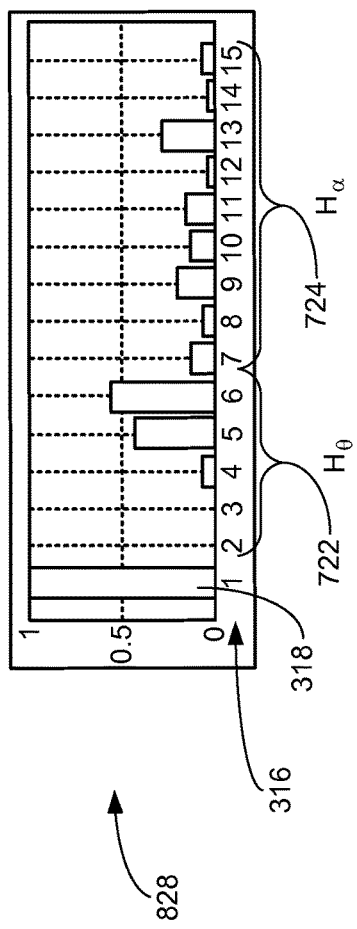
FIG. 8 is a feature vector in a vector determination phase of operation.

Referring now to FIG. 8, therein is shown a feature vector 828 in a vector determination phase of operation. The feature vector 828 is defined as a histogram which combines the various kinds of the text features 316 of the text unit 250 of FIG. 2 in one chart. In this example, the various frequencies of the isolated feature 318, the angle $\theta$ feature 722, and the angle $\alpha$ feature 724 can be combined by the feature vector module, for example, to generate the feature vector 828. This approach can also be described as a "bag-of-text-features" approach to text recognition.

This example uses the isolated feature 318 and two angle features to determine the feature vector 828, but it is understood that this is for illustrative purposes only. The feature vector 828 can use other kinds of the text features 316 to further refine the feature vector 828.

The feature vector 828 can be used by the text recognition module to determine what character, word, or phrase has been detected within the text unit 250, for example. The determination of the content of the text unit 250 can be done by matching the feature vector 828 with a "dictionary" of previously trained feature vectors. The feature vector 828 can be different for each possible character, word, or phrase of the text unit 250. Once a good match has been found, recognized text can be output for display on the display interface 106 of FIG. 1, or the text can be saved into a text file for later analysis or use.

It has been discovered that the use of the feature vector 828 in the text recognition system 100 allows for greater detection and recognition quality among a greater variation of text. The feature vector 828 does not require segmentation, nor does it require all letters in a word to be separated from each other. The feature vector 828 allows a robust and quantitative analysis to be done on entire words in any language without segmentation, even if all letters in a word are connected (such as in cursive writing or in a script such as Arabic), because the feature vector 828 can be generated to assure that the feature vector 828 for different words will be easily distinguishable.

It has also been discovered that the approach taken in the text recognition system 100 of combining many different types of the text features 316 to determine the feature vector 828 allows for simple scaling to encompass words, entire phrases, and beyond. When greater precision is necessary, additional types of the text features 316 aside from the isolated features 318, the angle $\theta$ feature 722, and the angle $\alpha$ feature 724 can be added to the feature vector 828, increasing precision. Alternatively, the resolution of the text features 316 can be increased by decreasing the spacing between the boundary points 420 of FIG. 4, for example. Any number of the text features 316 can be used to determine the feature vector 828, making the approach taken by the text recognition system 100 easily scalable and robust.

It has also been found that the approach taken by the text recognition system 100 of combining many different types of the text features 316 to determine the feature vector 828 allows for faster detection of recognized text. Because no segmentation is required, and the text recognition system 100 can operate on words and even entire phrases, significantly less processing power is required to identify text.

Figure 9:
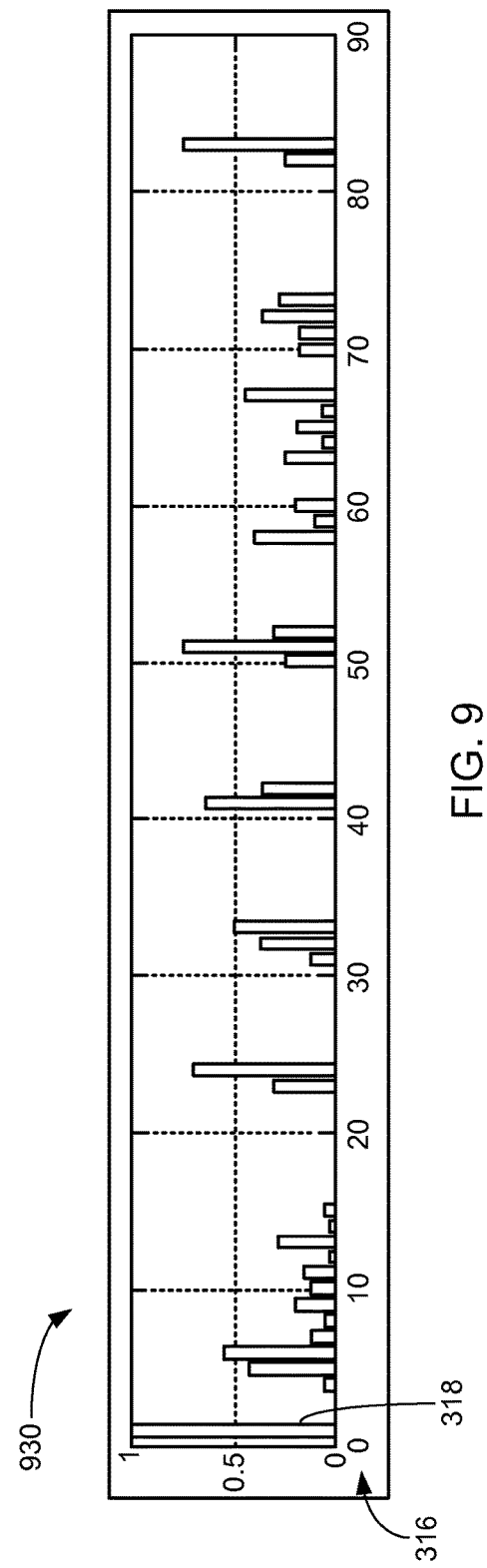
FIG. 9 is results from an alternative vector determination phase of operation.

Referring now to FIG. 9, therein is shown results from an alternative vector determination phase of operation. A spatial pyramid feature vector 930 can be generated from the text unit 250 of FIG. 2. In this example of the spatial pyramid feature vector 930, it is determined by first detecting the isolated features 318 of the text unit 250 and then going through spatial pyramid matching to generate a histogram of the text features 316 of blocks of the text unit 250 at different levels of division, for example. The spatial pyramid feature vector 930 can be determined by combining the isolated features 318 with concatenated histograms from different levels of division. A simple abstract example of two levels of division for spatial pyramid matching is shown in FIG. 10.

Figure 10:
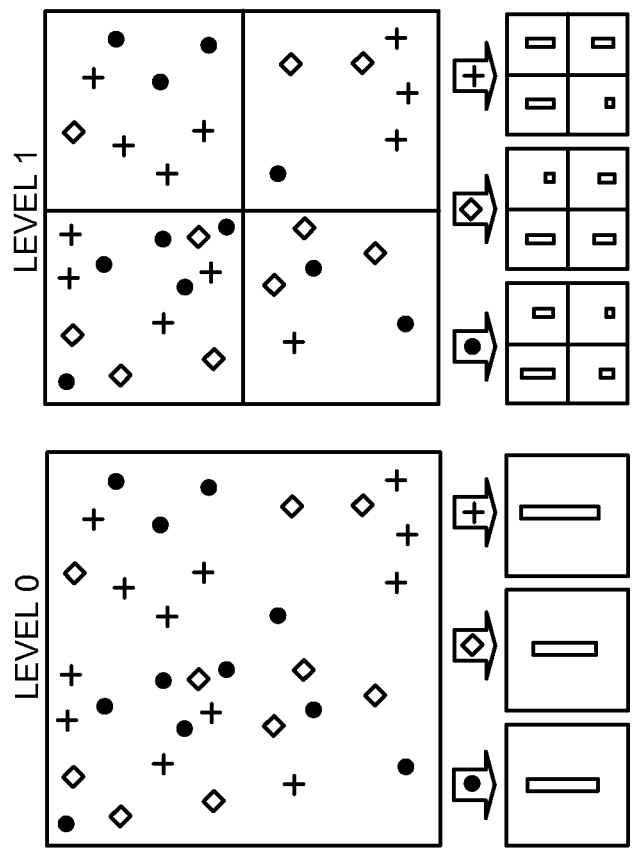
FIG. 10 is an abstract example of how spatial pyramid matching works.

Referring now to FIG. 10, therein is shown an abstract example of how spatial pyramid matching works. For example, at each level, the blocks are divided more and more finely, and histograms for each block are generated. The histograms of each level can all be concatenated to create a unique histogram that can be a part of the spatial pyramid feature vector 930 of FIG. 9, for example.

Figure 11:
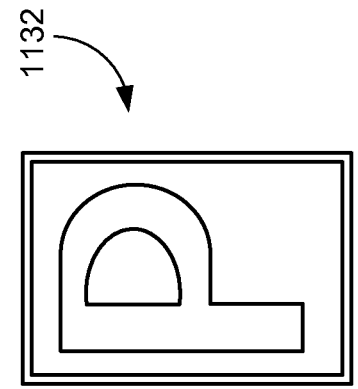
FIG. 11 is an example of recognized text in a recognized text output phase of operation.

Referring now to FIG. 11, therein is shown an example of recognized text 1132 in a recognized text output phase of operation. After the feature vector 828 of FIG. 8 for the text unit 250 of FIG. 2 has been matched to a known feature vector, the text unit 250 can be recognized as the letter "P", for example. The recognized text 1132 can be displayed on the display interface 106 of FIG. 1 or can be stored until more than one of the text unit 250 have been analyzed, and then displayed, printed, stored in a digital file, or otherwise recorded or shown, for example.

Figure 12:
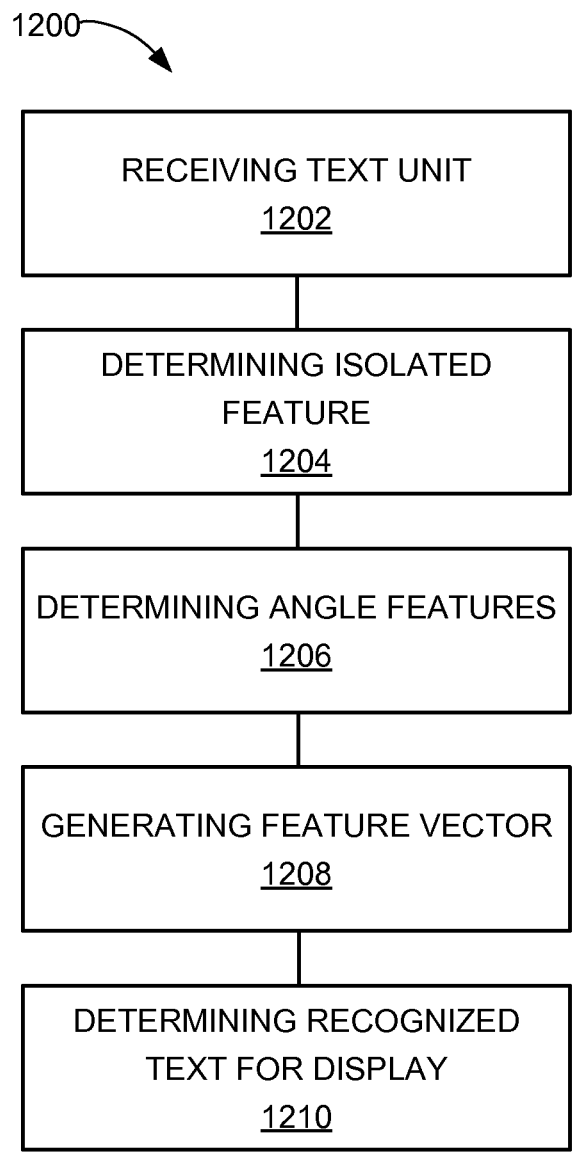
FIG. 12 is a flow chart of a method of operation of a text recognition system in a further embodiment of the present invention.

Referring now to FIG. 12, therein is shown a flow chart of a method 1200 of operation of a text recognition system in a further embodiment of the present invention. The method 1200 includes: receiving a text unit in a block 1202; determining an isolated feature of the text unit in a block 1204; determining angle features of the text unit in a block 1206; generating a feature vector for the text unit based on the isolated feature and the angle features in a block 1208; and determining recognized text using the feature vector for display on a display interface in a block 1210.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a text recognition system comprising:
   receiving a text unit;
   determining an isolated feature of the text unit;
   determining boundary points of the text unit;
   determining angle features of the text unit based on the boundary points;
   generating a feature vector for the text unit based on the isolated feature and the angle features; and
   determining recognized text using the feature vector for display on a display interface, wherein determining the angle features includes:
      selecting three of the boundary points which are adjacent to one another;
      drawing lines between each of the boundary points and its nearest neighbor; and
      determining an angle $\theta$ between the lines.

2. The method as claimed in claim 1 wherein determining the angle features of the text unit includes:
   determining an angle $\theta$ feature; and
   determining an angle $\alpha$ feature.

3. The method as claimed in claim 1 wherein receiving the text unit includes receiving the text unit having a background region and a text region.

4. A method of operation of a text recognition system comprising:
   receiving a text unit having a background region and a text region;
   determining an isolated feature of the text unit;
   determining boundary points of the text unit;
   determining angle features based on the boundary points;
   generating a feature vector for the text unit based on the isolated feature and the angle features; and
   determining recognized text using the feature vector for display on a display interface, wherein determining the angle features includes:
      selecting two of the boundary points which are adjacent to one another;
      determining a text horizontal;
      drawing a line between the boundary points; and
      determining an angle $\alpha$ between the text horizontal and the line.

5. The method as claimed in claim 4 wherein determining the boundary points of the text unit includes determining a boundary between the background region and the text region.

6. The method as claimed in claim 4 wherein generating the feature vector includes generating a spatial pyramid feature vector.

7. A text recognition system comprising:
   a storage unit for storing a text unit; and
   a processing unit, connected to the storage unit, the processing unit including:
      a communication interface for receiving the text unit,
      a feature detection module, coupled to the communication unit, for determining an isolated feature of the text unit, an angle detection module, coupled to the communication unit, for determining angle features of the text unit, a boundary determination module, coupled to the angle detection module, for determining boundary points of the text unit, a feature vector module, coupled to the feature detection module and the angle detection module, for generating a feature vector for the text unit based on the isolated feature and the angle features, and a text recognition module, coupled to the feature vector module, for determining recognized text using the feature vector for display on a display interface, wherein the angle detection module is for:
selecting three of the boundary points which are adjacent to one another;
drawing lines between each of the boundary points and its nearest neighbor; and
determining an angle θ between the lines.

8. The system as claimed in claim 7 further comprising an imaging device connected to the processing unit or the storage unit.

9. The system as claimed in claim 7 further comprising a light source for providing light for an imaging device.

10. The system as claimed in claim 7 wherein the processing unit includes the boundary determination module for detecting a background region and a text region of the text unit.

11. The system as claimed in claim 7 further comprising:
an imaging device connected to the processing unit or the storage unit;
a light source for providing light for the imaging device; and
wherein the processing unit includes:
the boundary determination module, coupled to the angle detection module, for detecting a background region and a text region of the text unit.

12. The system as claimed in claim 11 wherein the boundary determination module is for determining a boundary between the background region and the text region.

13. The system as claimed in claim 11 wherein the feature vector module is for generating a spatial pyramid feature vector.

14. A text recognition system comprising:
a storage unit for storing a text unit; and
a processing unit, connected to the storage unit, the processing unit including:
a communication interface for receiving the text unit,
a feature detection module, coupled to the communication unit, for determining an isolated feature of the text unit,
an angle detection module, coupled to the communication unit, for determining angle features of the text unit,
a boundary determination module, coupled to the angle detection module, for determining boundary points of the text unit,
a feature vector module, coupled to the feature detection module and the angle detection module, for generating a feature vector for the text unit based on the isolated feature and the angle features, and
a text recognition module, coupled to the feature vector module, for determining recognized text using the feature vector for display on a display interface, wherein the angle detection module is for:
selecting two of the boundary points which are adjacent to one another;
determining a text horizontal;
drawing a line between the boundary points; and
determining an angle α between the text horizontal and the line.

15. The system as claimed in claim 14 further comprising an imaging device connected to the processing unit or the storage unit.

16. The system as claimed in claim 14 further comprising a light source for providing light for an imaging device.

17. The system as claimed in claim 14 wherein the processing unit includes the boundary determination module for detecting a background region and a text region of the text unit.

18. The system as claimed in claim 14 further comprising:
an imaging device connected to the processing unit or the storage unit;
a light source for providing light for the imaging device; and
wherein the processing unit includes:
the boundary determination module, coupled to the angle detection module, for detecting a background region and a text region of the text unit.

19. The system as claimed in claim 18 wherein the boundary determination module is for determining a boundary between the background region and the text region.

20. The system as claimed in claim 18 wherein the feature vector module is for generating a spatial pyramid feature vector.

* * * * *